United States Patent Office 3,514,206
Patented May 26, 1970

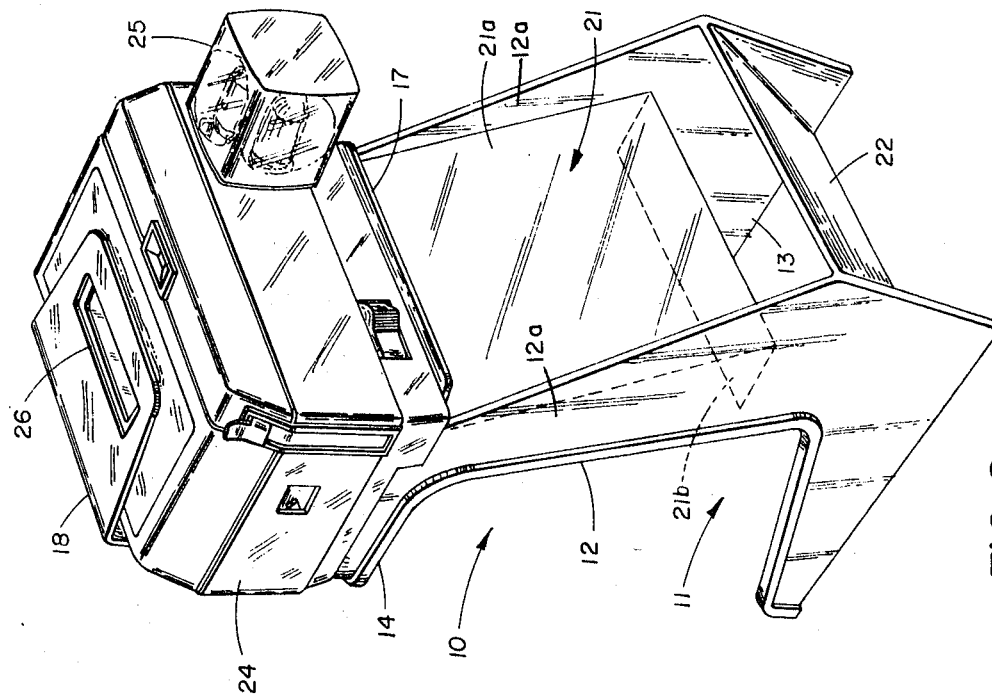
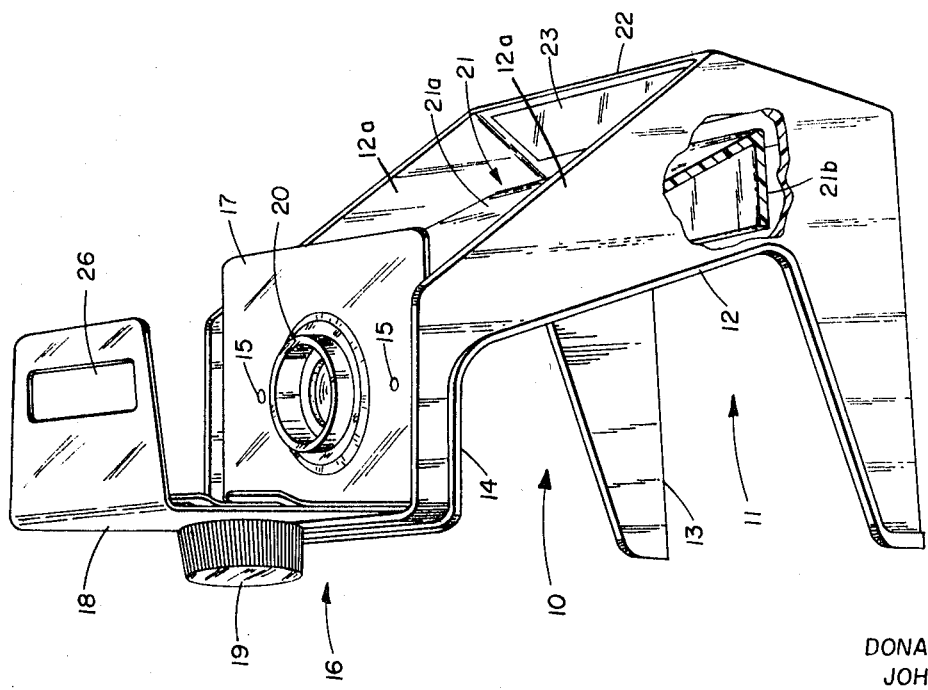

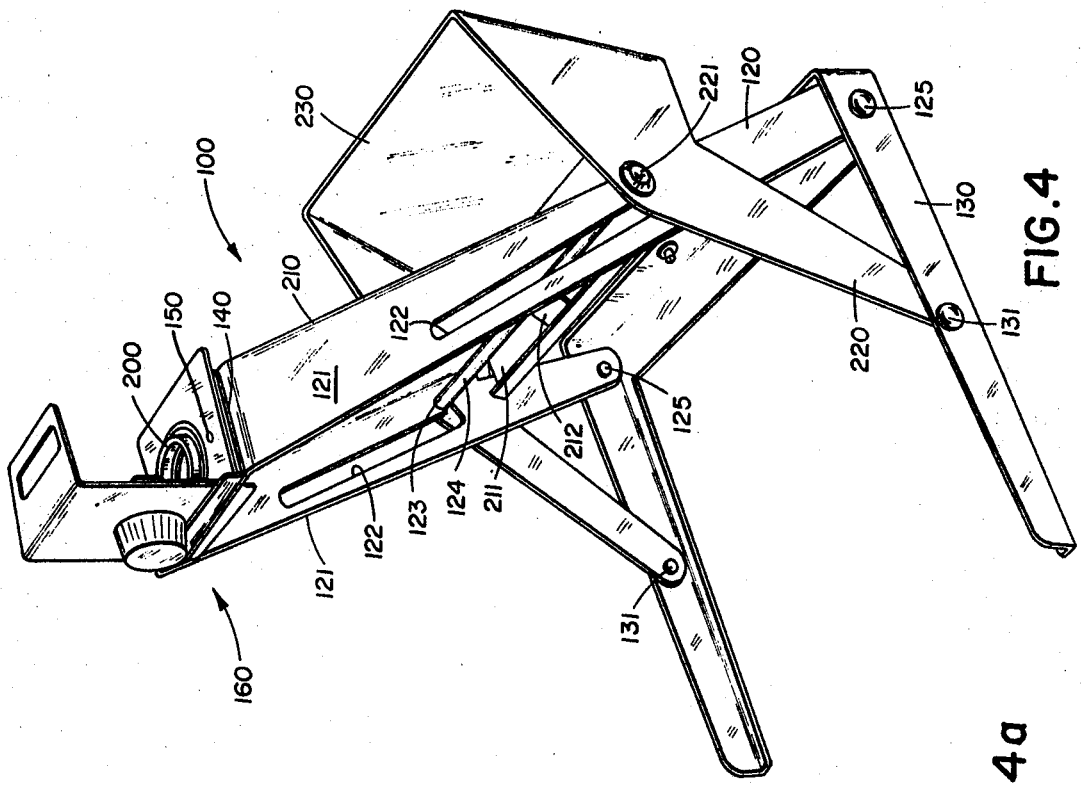
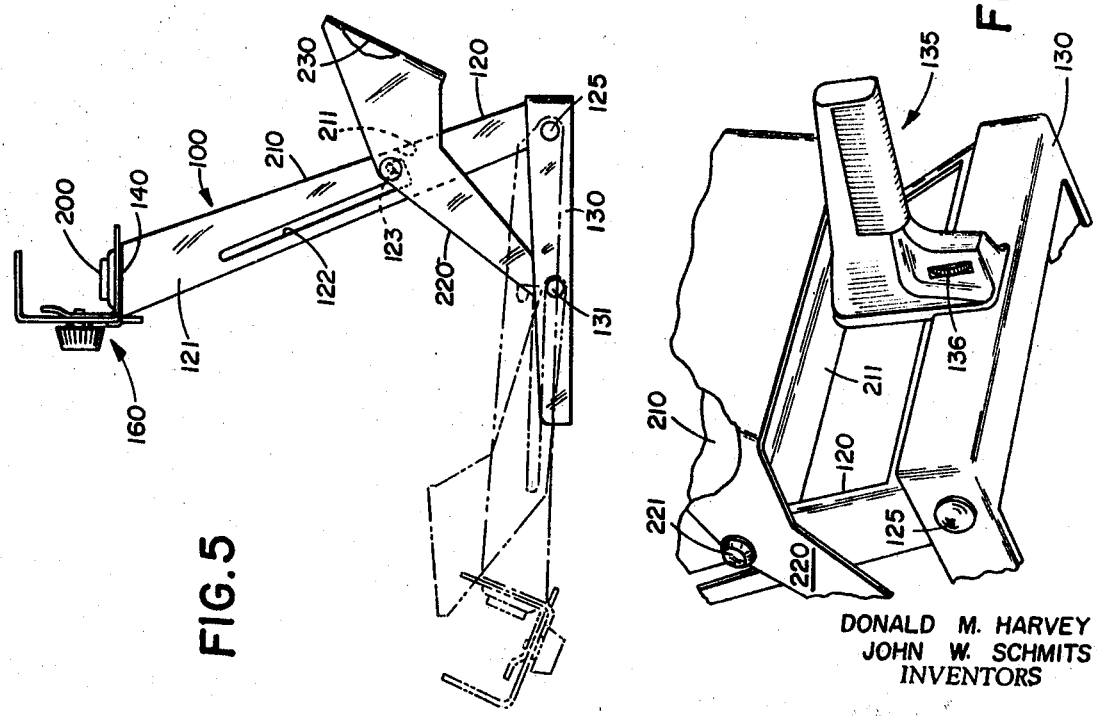

3,514,206
APPARATUS FOR MAKING CLOSE-UP PHOTO-GRAPHS WITH A PHOTOFLASH CAMERA
Donald M. Harvey and John W. Schmits, Rochester, N.Y., assignors to Eastman Kodak Company, Rochester, N.Y., a corporation of New Jersey
Filed July 14, 1967, Ser. No. 653,409
Int. Cl. G03b 27/76
U.S. Cl. 355—67                                     15 Claims

ABSTRACT OF THE DISCLOSURE

Apparatus for facilitating the making of close-up photographic exposures with a photoflash camera such as one employing a flashcube. The apparatus includes means for attenuating and reflecting light from the camera photoflash onto the subject of photographic interest, thereby indirectly, uniformly and non-glaringly illuminating the photographic subject at an appropriate level for exposure. An auxiliary lens is incorporated in the apparatus for adjusting the camera focus to a plane substantially coincident with that of the photographic subject.

BACKGROUND OF THE INVENTION

Field of the invention

This invention relates to apparatus adapted for use in making close-up photographs, and particularly to such apparatus for making close-up photographic exposures with a photoflash camera.

Description of the prior art

It is well known to provide a fixture for holding a camera and/or the subject to be photographed so as to maintain the two in a relationship suitable for making close-up photographs. It is also known to provide such a device with an auxiliary lens to assist in focusing the camera on the subject. In all such prior-art apparatus, however, means separate from the camera itself are relied upon to provide adequate illumination. Some holding devices have no means incorporated therein for augmenting ambient light. Others provide artificial illumination of the subject by means of lamps and reflectors connected to the structure of the device. Holders known in the art, therefore, present the inconvenience of being operable only where ambient illumination (either natural or artificial) is adequate or the disadvantages of being complex, costly, and unwieldy.

SUMMARY OF THE INVENTION

The present invention comprises a simple and compact device for maintaining a photoflash camera and the subject to be photographed in a relationship suitable for making close-up photographs, wherein light from the camera flash is used to illuminate the subject to be photographed. The device can be used with a camera having, as its source of illumination, a flashcube, and means are provided by which light from the camera flash is used to effect an appropriate level of substantially uniform, non-glaring, indirect illumination of the subject.

Generally stated, a preferred embodiment of the invention comprises a photoflash-camera-mounting fixture with a baffle and diffuse surface to attenuate and reflect light from the camera flash onto the subject area, which is defined by a portion of the fixture suitably located with respect to the camera, and an auxiliary lens to adjust the camera focus to a plane substantially coincident with that of the subject.

The various objects and advantages of this invention will become apparent in the detailed description of two preferred embodiments thereof appearing below, and its novel features will therein be particularly pointed out in connection with the appended claims.

BRIEF DESCRIPTION OF THE DRAWINGS

In the aforementioned detailed description of two preferred embodiments, which appears below, reference is made to the accompanying drawings, in which:

FIG. 1 is a side perspective view of one embodiment of the invention adapted specifically for use with a camera utilizing a multilamp flash unit of the flashcube type;

FIG. 2 is an oblique perspective view of the embodiment of FIG. 1 showing a flashcube camera mounted therein ready for use;

FIG. 4 is a perspective view of another embodiment of the invention which is similar to that of FIGS. 1, 2, and 3 but is larger and collapsible;

FIG. 4a is a fragmentary perspective view of the lower-rear portion of the embodiment of FIG. 4 showing a removable handle attached thereto; and FIG. 5 is a side-elevation view of the embodiment of FIG. 4 showing in solid lines the structure in its erect position, ready for use, and in broken lines the structure as collapsed to facilitate storage and carrying.

DESCRIPTION OF THE PREFERRED EMBODIMENTS

Figure 3:
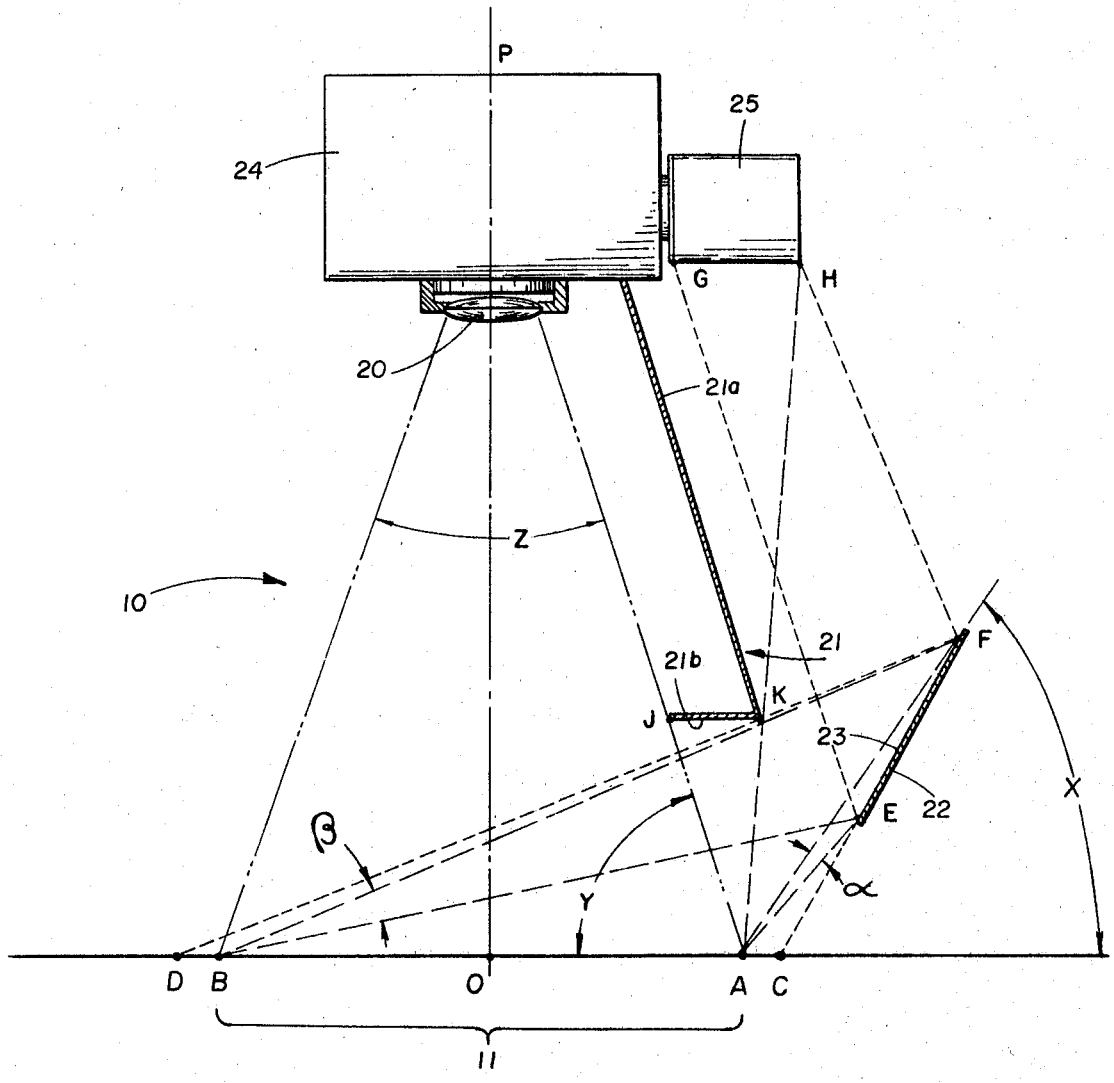
FIG. 3 is a schematic vertical section of the embodiment of FIGS. 1 and 2, with parts omitted for clarity of illustration, showing its principal elements in relation to each other and to the camera mounted therein.

The embodiment shown in FIGS. 1, 2, and 3, hereinafter referred to as a "copy stand" and designated generally by the numeral 10, is designed to accommodate smaller subjects, for example, those up to 3" x 3" in area, the subject area being designated generally by the numeral 11. Copy stand 10 includes a frame 12 having side portions 12a, a base portion 13 delimiting subject area 11, and a camera-mounting portion 14. Attached to the camera-mounting 14, by known fastening means such as rivets 15, is a camera-clamping assembly, designated generally by the numeral 16, which is comprised of an L-shaped clamp base 17 and an adjustable L-shaped clamping member 18. Vertical adjustment of clamping member 18 is afforded by knob 19, which is rotatably mounted on a shaft that passes through a vertical slot in the vertical leg of clamping member 18 and is fixed to the vertical leg of clamp base 17. The face of knob 19 adjacent to clamping member 18 is provided with a pair of cam surfaces which bear against corresponding vertically elongated bosses on the vertical leg of clamping member 18 in order to effect tightening or loosening of member 18 with respect to clamp base 17 by a simple turn of knob 19. In the horizontal leg of clamping member 18 is a slot 26 that exposes to view the film-frame-number window of the camera clamped in place, as best seen in FIG. 2.

Fixed in camera-mounting portion 14 and clamp base 17 is an auxiliary lens assembly 20, the optical axis of which intersects the center of subject area 11. The function of the auxiliary lens is to aid in focusing the camera on the subject presented in subject area 11.

Fixed to frame 12 between camera-mounting portion 14 and base portion 13, and transversely joining side portions 12a, are an L-shaped baffle 21 and a reflector 22. As will be seen, the generally downward extending leg 21a of baffle 21 is positioned to prevent camera flash illumination from striking subject area 11 directly. Similarly, the horizontal leg 21b at the lower end of baffle 21 is positioned to prevent camera flash illumination reflected by reflector 22 from striking auxiliary lens 20 directly. A portion of the upper surface of reflector 22 is covered with an adhesive-backed reflective cloth having a diffuse surface 23, such as that used in photographic projection screens, to attenuate and reflect camera flash illumination onto subject area 11. Generally speaking, reflector 22 is positioned to reflect camera flash illumination onto subject area 11 in a substantially uniform manner. In addition, diffuse surface 23 is positioned, with respect to subject area 11, baffle 21, and auxiliary lens assembly 20, to prevent an image of diffuse surface 23 from being reflected by a specular surface lying in subject area 11 into the camera field of view and a consequent fogging of the resulting photograph.

With reference to FIG. 3, point O in the subject plane designates the geometrical center of subject area 11. Line OP designates the optical axis of the camera and auxiliary lenses, which is perpendicular to the subject plane. Points A and B in the subject plane designate those points on the perimeter of subject area 11 that are, respectively, closest to and farthest from diffuse surface 23. Similarly, points C and D in the subject plane designate those points on the perimeter of the illuminated area (within which subject area 11 falls) that are, respectively, closest to and farthest from diffuse surface 23. Points E and F in the reflector plane designate those points on the perimeter of diffuse surface 23 that are, respectively, closest to and farthest from point C. Points G and H, in the flashcube-surface plane parallel with the subject plane, designate those points from which flash illumination emanates that are, respectively, closest to and farthest from camera 24. Points J and K, in the plane of horizontal leg 21b of baffle 21, designate those points on the perimeter of leg 21b that are, respectively, closest to and farthest from the camera field of view. Point K also represents the bottom edge of leg 21a of baffle 21, i.e., the vertex of the light-baffling surfaces of legs 21a and 21b.

As indicated by dashed line HA, baffle 21 is positioned to extend horizontally into the field of flash illumination just far enough, as at point K, to prevent flash illumination from striking subject area 11 directly. Similarly, leg 21b of baffle 21 is made to extend horizontally in the opposite direction far enough to prevent flash illumination reflected by reflector 22 from striking auxiliary lens 20 directly but, as at point J, not so far as to enter the camera field of view, shown bounded by the phantom lines delimiting field angle Z. At the same time, baffle 21 is positioned to extend vertically downward far enough to satisfy the foregoing requirements but, as at point K, not so far as to enter the field of flash illumination being reflected by diffuse surface 23 onto the subject plane.

Diffuse surface 23 on reflector 22 is positioned to reflect flash illumination onto an area in the subject plane that is slightly larger than, and includes, subject area 11. Accordingly, the upper and lower limits F and E of diffuse surface 23 are located, with respect to flashcube 25, subject area 11, and baffle 21, to delimit the field of flash illumination received from flashcube 25 as shown by dotted lines HF and GE, respectively, and the field of flash illumination reflected onto the subject plane as shown by dotted lines FD and EC, respectively, while avoiding interference with either of said fields of illumination by any part of baffle 21 such as point K. As viewed from point A, diffuse surface 23 subtends an angle $\alpha$ included between dashed lines AF and AE. Similarly, as viewed from point B, diffuse surface 23 subtends an angle $\beta$ included between dashed lines BF and BE.

Point A receives illumination reflected from diffuse surface 23 in direct proportion to the subtended angle $\alpha$ and in inverse proportion to the square of its distance from said surface. Similarly, point B receives illumination reflected from diffuse surface 23 in direct proportion to the subtended angle $\beta$ and in inverse proportion to the square of its distance from said surface. Although point B is more distant from the diffuse surface than is point A, the resulting greater inverse-square loss in illumination at point B is at least partially compensated for by the greater magnitude of angle $\beta$ as compared with angle $\alpha$, resulting in substantially uniform illumination between points A and B. It should be noted in this regard that both baffle 21 and diffuse surface 23 extend completely across the width of frame 12, joining side portions 12a thereof, to provide such substantially uniform illumination from one side to the other, i.e., over the entire subject area.

Still referring to FIG. 3, angle Y is the maximum angle that can be included between (1) the shortest straight line in the subject plane joining points O and A and (2) a light ray, in that plane perpendicular to the subject plane which contains said straight line, passing from point A directly to the auxiliary lens. As shown, angle Y is limited not only by the field angle provided by the camera and auxiliary lenses but also by the extent, if any, to which the baffle intrudes into the corresponding field of view. Angle X is the maximum angle that can be included between (1) an extension of said shortest straight line extending from point O radially outward in the subject plane beyond point A and (2) a light ray, in said plane perpendicular to the subject, passing from point A directly to the diffuse surface. As can be seen, angle X is limited not only by the size of the diffuse surface, i.e., its dimensions, but also by the horizontal, vertical, and angular position of the diffuse surface relative to point A.

Now, if angle Y were less than angle X, and if a flat and specular subject such as a glossy photographic print were lying in the subject plane within the subject area, then an image of all or part of the diffuse surface would be reflected by said subject into the camera field of view, causing a fogging of the resulting photograph. To prevent that from occurring, angle Y must be at least as great in magnitude as angle X, preferably greater as shown in FIG. 3.

Operation of copy stand 10, illustrated in FIGS. 1, 2, and 3, is simple. First, knob 19 is turned in its loosening direction to permit sliding of adjustable clamping member 18 upwardly as needed for insertion of camera 24 between the horizontal legs of clamping member 18 and clamp base 17. As shown, camera 24 is inserted so that its lens faces auxiliary lens assembly 20 and its flash unit 25 faces, generally, baffle 21 and reflector 22. Clamping member 18 is then pushed downward until its horizontal leg abuts the rear wall of camera 24, after which knob 19 is turned in its tightening direction to lock clamping member 18 and camera 24 in position. With the subject to be photographed placed in subject area 11, a flash exposure thereof can then be made by operating camera 24 in the usual manner.

The embodiment shown in FIGS. 4, 4a, and 5, hereinafter also referred to as a "copy stand" and designated generally by the numeral 100, differs from copy stand 10, shown in FIGS. 1, 2, and 3, in these respects:

(1) It may be larger, accommodating, for example, subjects of up to 8" x 8" in area;

(2) It is collapsible, making it easy to store and transport; and (3) It is provided with a removable handle, of the pistol-grip type, to facilitate use of the stand while being hand-held.

Copy stand 100 includes a channel-shaped frame 120 having side portions 121 each of which is provided with an elongated slot 122, having an offset portion 123 at one end thereof, to receive a shaft 124 extending across the width of frame 120, through each slot 122, and beyond each side portion 121. As viewed in the erect position of stand 100, the upper end of frame 120 constitutes a camera-mounting portion 140, to which is attached, by known fastening means such as rivets 150, a camera-clamping assembly 160 that is identical to camera-clamping assembly 16 shown in FIGS. 1, 2, and 3 and described with reference to copy stand 10. Fixed in camera-mounting portion 140 is an auxiliary lens assembly 200 that is identical to lens assembly 20 in copy stand 10 except for different optical characteristics necessitated by the greater subject area and camera-to-subject distance in copy stand 100. Extending generally downward from camera-mounting portion 140, and transversely joining side portions 121, is a baffle 210 whose functions are the same as those of baffle 21 in copy stand 10. At the lower end of baffle 210 is a generally horizontal portion 211, corresponding to horizontal leg 21b of baffle 21 in copy stand 10, that extends immediately beneath the lower end of slot 122 in each side portion 121. Fixed to the upper surface of portion 211 is a detent spring 212 that biases shaft 124 in its fully seated position in the offset portion 123 of each slot 122. At the lower end of frame 120 is pivotally attached, by a push stud 125 in a receiving hole at the lower end of each side portion 121, a horizontal U-shaped base 130 that delimits the subject area as does base portion 13 of copy stand 10. Similarly attached to the middle portion of each leg of base 130, by push stud 131, is the lower end of one leg of a generally U-shaped reflector-support member 220. The middle portion of each leg of member 220 is, in turn, pivotally attached to one end of shaft 124, which protrudes through a hole in said middle portion and is capped by speed nut 221. The upper portion of member 220, transversely joining the leg portions thereof, constitutes the reflector portion, whose upward-facing surface is covered with an adhesive-backed reflective cloth having a diffuse surface 230 that performs the same function as does diffuse surface 23 in copy stand 10. As shown in FIG. 4a, copy stand 100 is provided with a detachable handle of the pistol-grip type, designated generally by the numeral 135, to aid in holding the stand in the absence of a supporting surface.

As mentioned above, the functions of and relationships between the elements comprising copy stand 100 are the same as those previously described with reference to like elements of copy stand 10. Operation of the two stands is likewise the same after stand 100 has been extended to its erect position, shown in solid lines in FIG. 5. To collapse stand 100 to the position shown in broken lines in FIG. 5, sufficient downward pressure must first be exerted upon speed nuts 221 to overcome the biasing force of detent spring 212 and push shaft 124 out of offset portion 123 and into the main portion of each slot 122. Pressure can then be applied to speed nuts 221 in a generally upward direction to commence movement of shaft 124 upward in slots 122. Camera-mounting portion 140 can then be pulled over toward the open end of base 130, causing frame 120 to pivot about studs 125, reflector-support member 220 to pivot about studs 131, and shaft 124 to slide in slots 122 toward the camera-mounting portion. Such movement is continued until stand 100 is completely collapsed as shown by the broken lines in FIG. 5. Reversal of this procedure will restore the stand to its erect position. The pistol-grip handle 135, shown in FIG. 4a, can easily be removed or attached by turning screw 136 out of or into a mating threaded hole, not shown, in the end portion of base 130.

In summarizing the two embodiments just described it will be noted that both copy stands 10 and 100 are devices that (1) maintain a photoflash camera and the subject to be photographed in a relationship suitable for making close-up photographs, (2) in such a way that light from the camera flash is used to illuminate the subject, (3) through means effecting an appropriate level of substantially uniform, non-glaring, indirect illumination of the subject area, (4) utilizing a camera having, as its source of illumination, a multilamp flash package of the flashcube type attached thereto, and (5) are of simple, inexpensive, and compact design, (6) being readily usable anywhere regardless of the availability of ambient lighting means.

While the foregoing description relates to two specific embodiments of this invention adapted particularly for use with a camera utilizing a multilamp flash unit of the flashcube type, it should be apparent that the same inventive concepts and novel features could be embodied in other structures adapted for use with cameras employing different types of photoflash units. Thus the invention has been described in detail with particular reference to preferred embodiments thereof, but it will be understood that variations and modifications can be effected within the spirit and scope of the invention as described hereinabove and as defined in the appended claims.

We claim:

1. Photographic apparatus for use in making close-up photographic exposures with a camera of the type having a picture taking lens and a photoflash unit, said apparatus comprising:
    (a) a frame having a first portion providing a camera-subject area and a second portion for mounting a camera;
    (b) means for supporting a photoflash camera on said camera-mounting portion in an orientation with the taking lens facing said subject area;
    (c) a reflector on said frame having a diffuse surface arranged to attenuate and reflect illumination from the camera photoflash unit onto said camera-subject area, whereby an appropriate level of indirect camera flash illumination of said camera-subject area can be provided for making a correct photographic exposure; and
    (d) means associated with said frame for preventing illumination from a supported photoflash camera from directly striking said camera-subject area and from being reflected by said reflector directly into said taking lens.

2. The photographic apparatus claimed in claim 1, further comprising an auxiliary lens on said frame to adjust the camera focus to a plane substantially coincident with said subject area.

3. Photographic apparatus for use in making close-up photographic exposures with a camera of the type having a picture taking lens and a photoflash unit, said apparatus comprising:
    (a) a frame having a first portion providing a camera-subject area and a second portion for mounting a camera;
    (b) means for supporting a photoflash camera on said camera-mounting portion in an orientation with the taking lens facing said subject area;
    (c) a reflector on said frame having a diffuse surface for attenuating and reflecting illumination from the camera photoflash unit onto said camera-subject area, whereby an appropriate level of indirect camera flash illumination of said camera-subject area can be provided for making a correct photographic exposure, said diffuse surface being arranged with respect to said frame by a relationship in which the angle subtended by said diffuse surface, as viewed from a point on that part of the perimeter of said camera-subject area which is farthest from said diffuse surface, is greater in magnitude than the angle subtended by said diffuse surface, as viewed from a point on that part of the perimeter of said camera-subject area which is closest to said diffuse surface, whereby said camera flash illumination may be reflected uniformly onto said camera-subject area; and
    (d) means associated with said frame for preventing illumination from a supported photoflash camera from directly striking said subject area and from being reflected by said reflector directly into said taking lens.

4. The photographic apparatus claimed in claim 1 wherein said preventing means and said diffuse surface are dimensioned and oriented with respect to said frame by a relationship in which
    (a) the maximum angle includable between (1) the shortest straight line, in the plane of said subject area, joining the center of said subject area and a point on that part of the perimeter of said subject area which is closest to said diffuse surface and (2)

a light ray, in that plane perpendicular to the plane of said subject area which contains said straight line, passing from said point on said perimeter directly to said auxiliary lens is at least as great in magnitude as (b) the maximum angle includable between (1) an extension of said straight line extending from said center radially outward beyond said point on said perimeter and (2) a light ray, in said plane perpendicular to the plane of said subject area, passing from said point on said perimeter directly to said diffuse surface in order to prevent an image of said diffuse surface from being reflected by a specular surface in said subject area into the camera field of view.

5. The photographic apparatus claimed in claim 1 wherein said first frame portion comprises a base for said frame having an opening therein providing said subject area.

6. The photographic apparatus claimed in claim 1 having at least two parts which are hingedly connected to each other to render said apparatus collapsible.

7. Photographic apparatus, for use in making close-up photographic exposures with a photoflash camera, which comprises:

(a) a frame having a first end portion providing a camera subject area and a second end portion having means for supporting a photoflash camera in a position for photographing said subject area;

(b) a reflector on said frame between said first and second end portions, said reflector having a diffuse surface arranged to attenuate and reflect illumination from a supported photoflash camera onto said subject area; and (c) a baffle on said frame between said first and second end portions, said baffle having a first surface arranged to prevent illumination from a supported photoflash camera from striking said subject area directly and a second surface arranged to prevent illumination from a supported photoflash camera reflected by said reflector from striking said camera directly;

whereby an appropriate level of indirect camera flash illumination of said subject area can be provided for making a correct photographic exposure of a subject located in said subject area.

8. The photographic apparatus claimed in claim 7 wherein said first end portion comprises a U-shaped base the three sides of which provide said subject area.

9. The photographic apparatus claimed in claim 7, further comprising an auxiliary lens in said second end portion arranged to adjust the camera focus to a plane substantially coincident with said subject area, the optical axis of said lens intersecting the center of said subject area.

10. The photographic apparatus claimed in claim 7 wherein said supporting means comprises a clamping member for holding said camera in a position for photographing said subject area.

11. The photographic apparatus claimed in claim 7 wherein said reflector and said baffle are located at the same side relative to the field of view of said camera.

12. The photographic apparatus claimed in claim 7 wherein said baffle is generally L-shaped, comprising a first leg that extends in a substantially longitudinal direction relative to said frame and provides said first surface and a second leg that extends in a substantially transverse direction relative to said frame and provides said second surface, the planes of said first and second surfaces intersecting at the vertex of said first and second legs.

13. The photographic apparatus claimed in claim 7 having at least two parts which are hingedly connected to each other to render said apparatus collapsible.

14. The photographic apparatus claimed in claim 13, further comprising a handle attached to said frame to aid in holding said apparatus.

15. Photographic apparatus, for use in making close-up photographic exposures with a photoflash camera, which comprises:

(a) a base providing a camera subject area;

(b) a frame having first and second ends, said first end being hingedly connected to said base, said second end having means for retaining a photoflash camera in position to photograph said subject area, said frame supporting between said first end and said second end a baffle arranged to prevent illumination from a retained photoflash camera from striking said subject area directly; and (c) a member having a first end portion, a second end portion, and a mid-portion between said first and second end portions, said first end portion being hingedly connected to said base, said mid-portion being both hingedly and slidably connected to said frame, and said second end portion supporting a reflector having a diffuse surface arranged to attenuate and reflect illumination from a retained photoflash camera onto said subject area;

whereby indirect camera flash illumination can be provided for making a correct photographic exposure of a subject in said subject area using apparatus that can be collapsed to facilitate storage and transit thereof.

References Cited

UNITED STATES PATENTS 1,763,231   6/1930   Fritts _____ 355—39

FOREIGN PATENTS 1,089,858   10/1954   France.

NORTON ANSHER, Primary Examiner

R. A. WINTERCORN, Assistant Examiner

U.S. Cl. X.R.

95—1.1, 12